(12) United States Patent
Karthik et al.

(10) Patent No.: US 11,656,949 B2
(45) Date of Patent: May 23, 2023

(54) SNAPSHOT RANGE FILTERS

(71) Applicant: Rubrik, Inc., Palo Alto, CA (US)

(72) Inventors: Vijay Karthik, Sunnyvale, CA (US);
Abdullah Reza, Gilroy, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 17/473,130

(22) Filed: Sep. 13, 2021

(65) Prior Publication Data

US 2023/0080500 A1 Mar. 16, 2023

(51) Int. Cl.
G06F 12/08 (2016.01)
G06F 11/14 (2006.01)

(52) U.S. Cl.
CPC ...... *G06F 11/1451* (2013.01); *G06F 11/1464* (2013.01); *G06F 11/1469* (2013.01); *G06F 2201/84* (2013.01)

(58) Field of Classification Search
CPC ............. G06F 11/1451; G06F 11/1464; G06F 11/1469; G06F 2201/84
See application file for complete search history.

(56) References Cited

U.S. PATENT DOCUMENTS

| 2011/0119459 | A1* | 5/2011 | Satoyama | G06F 11/1458 711/E12.103 |
| 2014/0149698 | A1* | 5/2014 | Ezra | G06F 12/0864 711/162 |
| 2018/0004656 | A1* | 1/2018 | Battaje | G06F 12/1009 |

* cited by examiner

Primary Examiner — Yair Leibovich
Assistant Examiner — Kyle Emanuele
(74) Attorney, Agent, or Firm — Holland & Hart LLP

(57) ABSTRACT

In some examples, a method comprises: receiving a request to read data within a specified range from a backup file storing at least one base snapshot and at least one incremental snapshot; looking up the specified range in range filters from the backup file, the range filters corresponding to snapshots stored in the backup file and each range filter comprising bits indicating whether data exists at respective ranges within the snapshot corresponding to the respective range filter; and in response to the looking up, reading the requested data from the looked-up range in the backup file.

20 Claims, 9 Drawing Sheets

SNAPSHOT RANGE FILTERS

FIELD

The present disclosure relates generally to computer architecture and computer architecture software for a data management platform and, in some more particular aspects, to methods and systems for searching snapshots.

BACKGROUND

The volume and complexity of data that is collected, analyzed and stored is increasing rapidly over time. The computer infrastructure used to handle this data is also becoming more complex, with more processing power and more portability. As a result, data management and storage is becoming increasingly important. Significant issues of these processes include access to reliable data backup and storage, and fast data recovery in cases of failure. Other aspects include data portability across locations and platforms.

BRIEF SUMMARY

The present disclosure relates generally to searching snapshots for data so that a file can be restored from backup.

In some examples, a method comprises: receiving a request to read data within a specified range from a backup file storing at least one base snapshot and at least one incremental snapshot; looking up the specified range in range filters from the backup file, the range filters corresponding to snapshots stored in the backup file and each range filter comprising bits indicating whether data exists at respective ranges within the snapshot corresponding to the respective range filter; and in response to the looking up, reading the requested data from the looked-up range in the backup file.

A further example includes computer include computer apparatus having a processor; and a memory storing instructions that, when executed by the processor, configure the apparatus to execute the method. Another example includes a non-transitory computer-readable storage medium, the computer-readable storage medium including instructions that when executed by a computer, cause the computer to execute the method.

BRIEF DESCRIPTION OF THE SEVERAL VIEWS OF THE DRAWINGS

Some embodiments are illustrated by way of example and not limitation in the views of the accompanying drawing.

DETAILED DESCRIPTION

Figure 1:
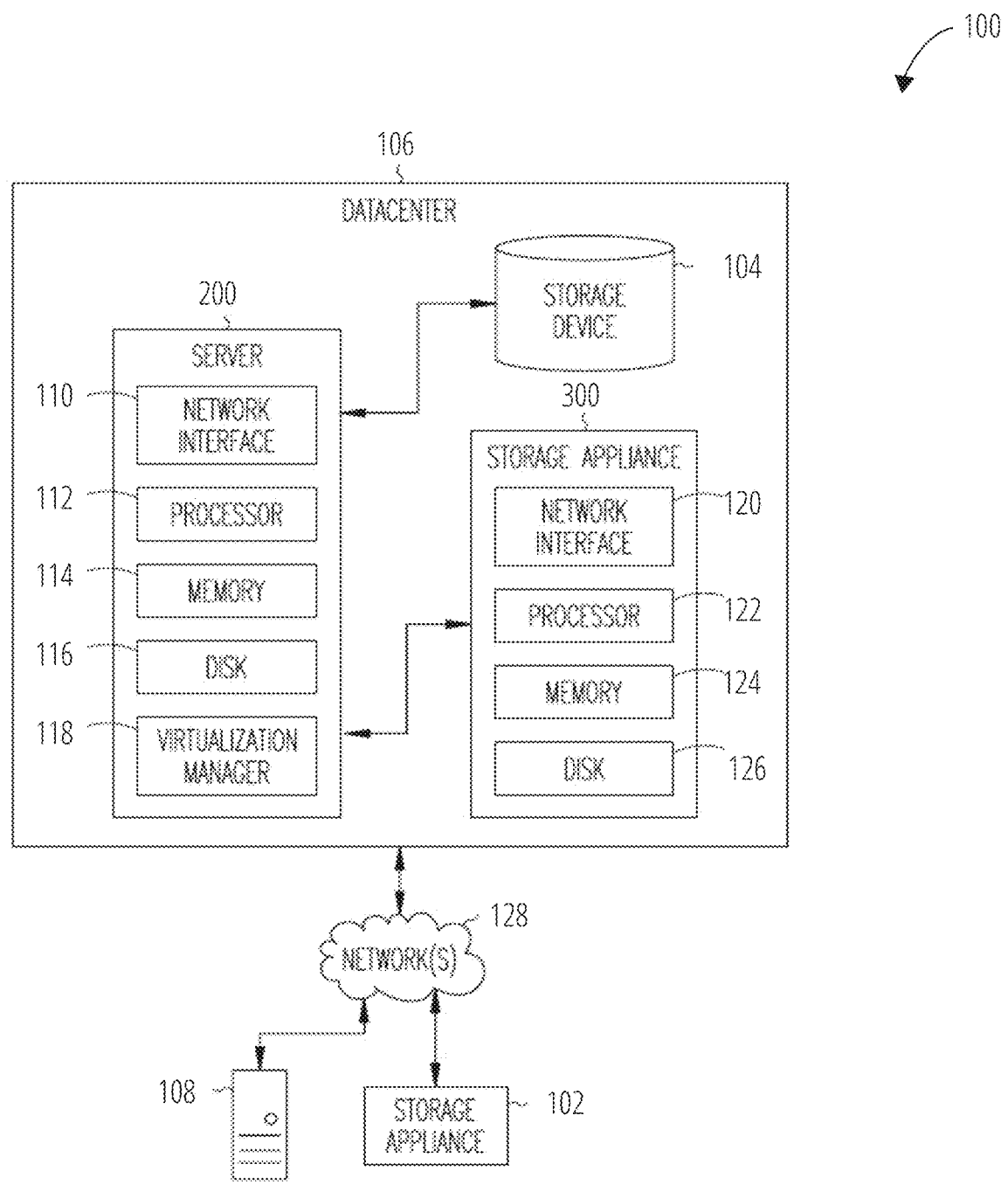
FIG. 1 depicts one embodiment of a networked computing environment in which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2021, All Rights Reserved.

It will be appreciated that some of the examples disclosed herein are described in the context of virtual machines that are backed up by using base and incremental snapshots, for example. This should not necessarily be regarded as limiting of the disclosures. The disclosures, systems and methods described herein apply not only to virtual machines of all types that run a file system (for example), but also to NAS devices, physical machines (for example Linux servers), and databases.

FIG. 1 depicts one embodiment of a networked computing environment 100 in which the disclosed technology may be practiced. As depicted, the networked computing environment 100 includes a data center 106, a storage appliance 102, and a computing device 108 in communication with each other via one or more networks 128. The networked computing environment 100 may also include a plurality of computing devices interconnected through one or more networks 128. The one or more networks 128 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 106 may include one or more servers, such as server 200, in communication with one or more storage devices, such as storage device 104. The one or more servers may also be in communication with one or more storage appliances, such as storage appliance 102. The server 200, storage device 104, and storage appliance 300 may be in communication with each other via a networking fabric connecting servers and data storage units within the data center 106 to each other. The storage appliance 300 may include a data management system for backing up virtual machines and/or files within a virtualized infrastructure. The server 200 may be used to create and manage one or more virtual machines associated with a virtualized infrastructure.

The one or more virtual machines may run various applications, such as a database application or a web server. The storage device 104 may include one or more hardware storage devices for storing data, such as a hard disk drive (HDD), a magnetic tape drive, a solid-state drive (SSD), a storage area network (SAN) storage device, or a Networked-Attached Storage (NAS) device. In some cases, a data center, such as data center 106, may include thousands of servers and/or data storage devices in communication with each other. The one or more data storage devices 104 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 128 may include a secure network such as an enterprise private network, an unsecure network such as a wireless open network, a local area network (LAN), a wide area network (WAN), and the Internet. The one or more networks 128 may include a cellular network, a mobile network, a wireless network, or a wired network. Each network of the one or more networks 128 may include hubs, bridges, routers, switches, and wired transmission media such as a direct-wired connection. The one or more networks 128 may include an extranet or other private network for securely sharing information or providing controlled access to applications or files.

A server, such as server 200, may allow a client to download information or files (e.g., executable, text, application, audio, image, or video files) from the server 200 or to perform a search query related to particular information stored on the server 200. In some cases, a server may act as an application server or a file server. In general, server 200 may refer to a hardware device that acts as the host in a client-server relationship or a software process that shares a resource with or performs work for one or more clients.

One embodiment of server 200 includes a network interface 110, processor 112, memory 114, disk 116, and virtualization manager 118 all in communication with each other. Network interface 110 allows server 200 to connect to one or more networks 128. Network interface 110 may include a wireless network interface and/or a wired network interface. Processor 112 allows server 200 to execute computer-readable instructions stored in memory 114 in order to perform processes described herein. Processor 112 may include one or more processing units, such as one or more CPUs and/or one or more GPUs. Memory 114 may comprise one or more types of memory (e.g., RAM, SRAM, DRAM, ROM, EEPROM, Flash, etc.). Disk 116 may include a hard disk drive and/or a solid-state drive. Memory 114 and disk 116 may comprise hardware storage devices.

The virtualization manager 118 may manage a virtualized infrastructure and perform management operations associated with the virtualized infrastructure. The virtualization manager 118 may manage the provisioning of virtual machines running within the virtualized infrastructure and provide an interface to computing devices interacting with the virtualized infrastructure. In one example, the virtualization manager 118 may set a virtual machine having a virtual disk into a frozen state in response to a snapshot request made via an application programming interface (API) by a storage appliance, such as storage appliance 300. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 118 may then transfer data associated with the virtual machine (e.g., an image of the virtual machine or a portion of the image of the virtual disk file associated with the state of the virtual disk at the point in time it is frozen) to a storage appliance (for example, a storage appliance 102 or storage appliance 300 of FIG. 1, described further below) in response to a request made by the storage appliance. After the data associated with the point in time snapshot of the virtual machine has been transferred to the storage appliance 300 (for example), the virtual machine may be released from the frozen state (i.e., unfrozen) and the updates made to the virtual machine and stored in the separate file may be merged into the virtual disk file. The virtualization manager 118 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of a storage appliance 300 (or storage appliance 102) includes a network interface 120, processor 122, memory 124, and disk 126 all in communication with each other. Network interface 120 allows storage appliance 300 to connect to one or more networks 128. Network interface 120 may include a wireless network interface and/or a wired network interface. Processor 122 allows storage appliance 300 to execute computer readable instructions stored in memory 124 in order to perform processes described herein. Processor 122 may include one or more processing units, such as one or more CPUs and/or one or more GPUs. Memory 124 may comprise one or more types of memory (e.g., RAM, SRAM, DRAM, ROM, EEPROM, NOR Flash, NAND Flash, etc.). Disk 126 may include a hard disk drive and/or a solid-state drive. Memory 124 and disk 126 may comprise hardware storage devices.

In one embodiment, the storage appliance 300 may include four machines. Each of the four machines may include a multi-core CPU, 64 GB of RAM, a 400 GB SSD, three 4 TB UDDs, and a network interface controller. In this case, the four machines may be in communication with the one or more networks 128 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 108. The storage appliance 102 may comprise a cloud-based data management system for backing up virtual machines and/or files within a virtualized infrastructure, such as virtual machines running on server 200/or files stored on server 200.

In some cases, networked computing environment 100 may provide remote access to secure applications and files stored within data center 106 from a remote computing device, such as computing device 108. The data center 106 may use an access control application to manage remote access to protected resources, such as protected applications, databases, or files located within the data center 106. To facilitate remote access to secure applications and files, a secure network connection may be established using a virtual private network (VPN). A VPN connection may allow a remote computing device, such as computing device 108, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 300 may manage the extraction and storage of virtual machine snapshots associated with different point in time versions of one or more virtual machines running within the data center 106. A snapshot of a virtual machine may correspond with a state of the virtual machine at a particular point-in-time. In response to a restore command from the storage device 104, the storage appliance 300 may restore a point-in-time version of a virtual machine or restore point-in-time versions of one or more files located on the virtual machine and transmit the restored data to the server 200. In response to a mount command from the server 200, the storage appliance 300 may allow a point-in-time version of a virtual machine to be mounted and allow the server 200 to read and/or modify data associated with the point-in-time version of the virtual machine. To improve storage density, the storage appliance 300 may deduplicate and compress data associated with different versions of a virtual machine and/or deduplicate and compress data associated with different virtual machines. To improve system performance, the storage appliance 300 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 300 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 300 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VVM5Nersion23). In one example, the storage appliance 300 may run an NFS server and make the particular version (or a copy of the particular version) of the virtual machine accessible for reading and/or writing. The end user of the storage appliance 300 may then select the particular version to be mounted and run an application (e.g., a data analytics application) using the mounted version of the virtual machine. In another example, the particular version may be mounted as an iSCSI target.

Figure 2:
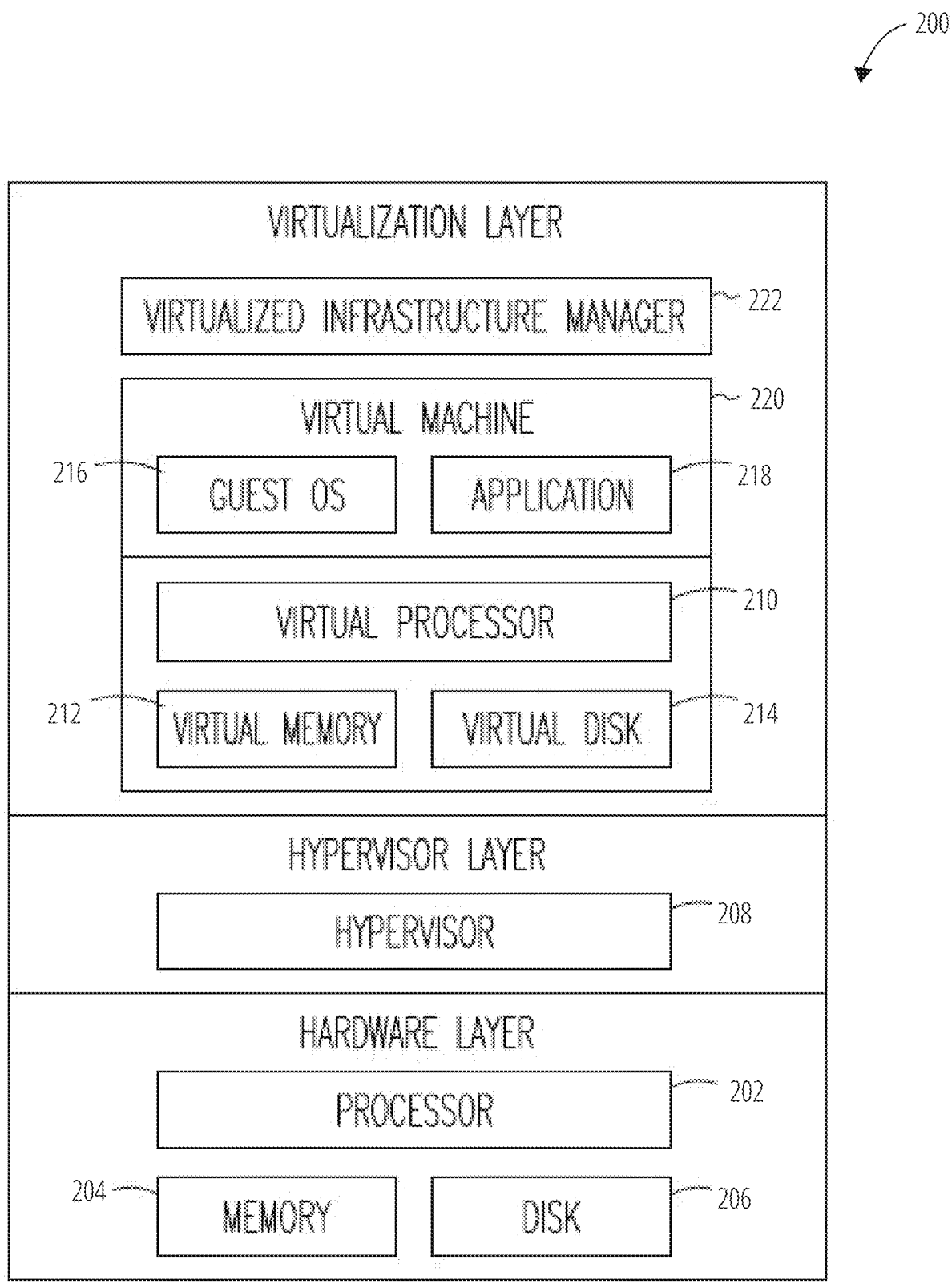
FIG. 2 depicts one embodiment of the server of FIG. 1, according to an example embodiment.

FIG. 2 depicts one embodiment of server 200 of FIG. 1. The server 200 may comprise one server out of a plurality of servers that are networked together within a data center (e.g., data center 106). In one example, the plurality of servers may be positioned within one or more server racks within the data center. As depicted, the server 200 includes hardware-level components and software-level components. The hardware-level components include one or more processors 202, one or more memory 204, and one or more disks 206. The software-level components include a hypervisor 208, a virtualized infrastructure manager 222, and one or more virtual machines, such as virtual machine 220. The hypervisor 208 may comprise a native hypervisor or a hosted hypervisor. The hypervisor 208 may provide a virtual operating platform for running one or more virtual machines, such as virtual machine 220. Virtual machine 220 includes a plurality of virtual hardware devices including a virtual processor 210, a virtual memory 212, and a virtual disk 214. The virtual disk 214 may comprise a file stored within the one or more disks 206. In one example, a virtual machine 220 may include a plurality of virtual disks 214, with each virtual disk of the plurality of virtual disks 214 associated with a different file stored on the one or more disks 206. Virtual machine 220 may include a guest operating system 216 that runs one or more applications, such as application 218.

The virtualized infrastructure manager 222, which may correspond with the virtualization manager 118 in FIG. 1, may run on a virtual machine or natively on the server 200. The virtual machine may, for example, be or include the virtual machine 220 or a virtual machine separate from the server 200. Other arrangements are possible. The virtualized infrastructure manager 222 may provide a centralized platform for managing a virtualized infrastructure that includes a plurality of virtual machines. The virtualized infrastructure manager 222 may manage the provisioning of virtual machines running within the virtualized infrastructure and provide an interface to computing devices interacting with the virtualized infrastructure. The virtualized infrastructure manager 222 may perform various virtualized infrastructure related tasks, such as cloning virtual machines, creating new virtual machines, monitoring the state of virtual machines, and facilitating backups of virtual machines.

In one embodiment, the server 200 may use the virtualized infrastructure manager 222 to facilitate backups for a plurality of virtual machines (e.g., eight different virtual machines) running on the server 200. Each virtual machine running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 102 in FIG. 1 or storage appliance 300 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 222 may set the virtual machine into a frozen state or store a copy of the virtual machine at the particular point in time. The virtualized infrastructure manager 222 may then transfer data associated with the virtual machine (e.g., an image of the virtual machine or a portion of the image of the virtual machine) to the storage appliance 300 or storage appliance 102. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 222 may transfer a full image of the virtual machine to the storage appliance 102 or storage appliance 300 of FIG. 1 or a plurality of data blocks corresponding with the full image (e.g., to enable a full image-level backup of the virtual machine to be stored on the storage appliance). In other cases, the virtualized infrastructure manager 222 may transfer a portion of an image of the virtual machine associated with data that has changed since an earlier point in time prior to the particular point in time or since a last snapshot of the virtual machine was taken. In one example, the virtualized infrastructure manager 222 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 222 may output one or more virtual data blocks associated with the virtual machine that have been modified between the first point in time and the second point in time.

In some embodiments, the server 200 or the hypervisor 208 may communicate with a storage appliance, such as storage appliance 102 in FIG. 1 or storage appliance 300 in FIG. 1, using a distributed file system protocol such as Network File System (NFS) Version 3, or Server Message Block (SMB) protocol. The distributed file system protocol may allow the server 200 or the hypervisor 208 to access, read, write, or modify files stored on the storage appliance as if the files were locally stored on the server 200. The distributed file system protocol may allow the server 200 or the hypervisor 208 to mount a directory or a portion of a file system located within the storage appliance.

Figure 3:
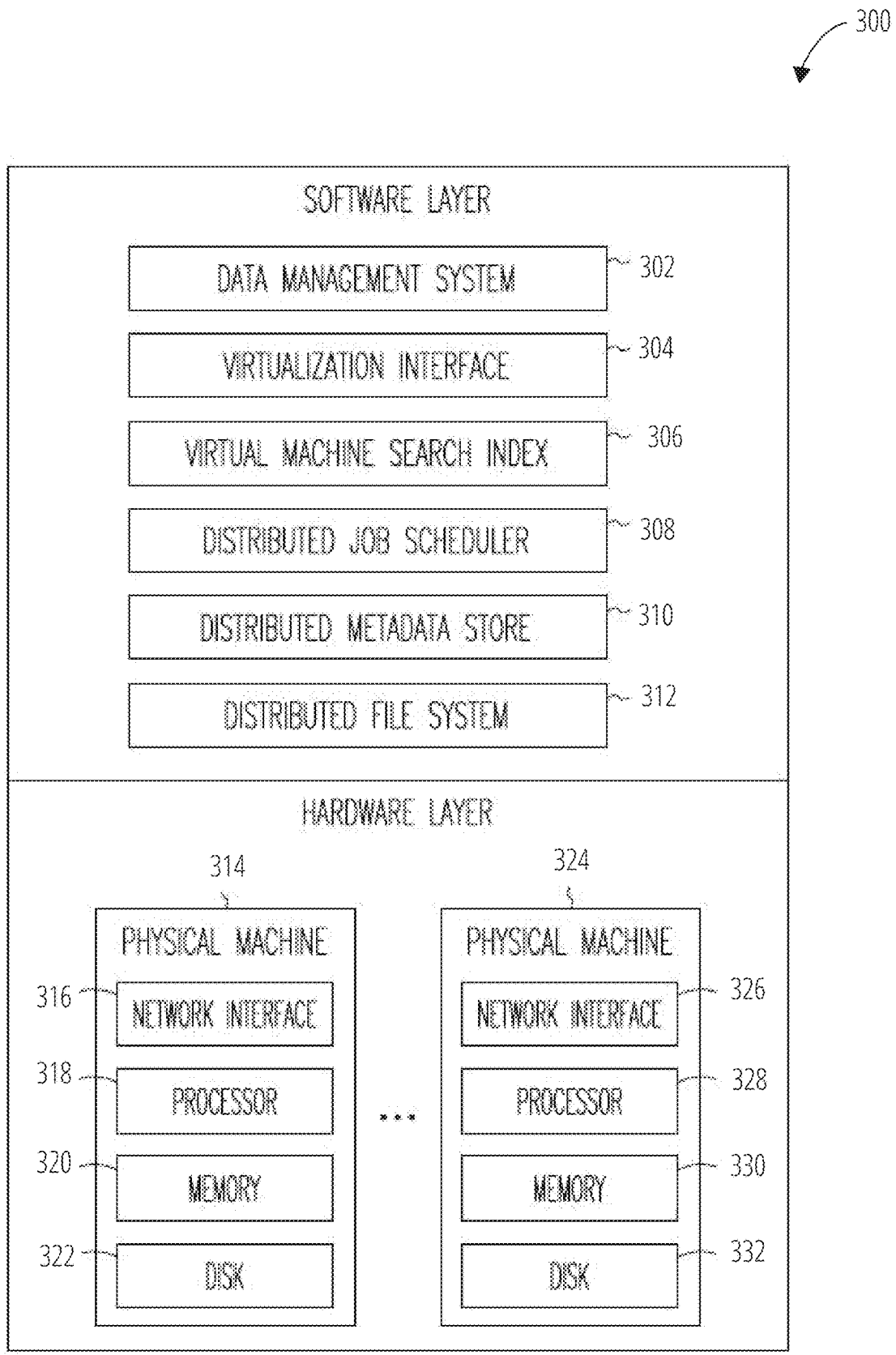
FIG. 3 depicts one embodiment of the storage appliance of FIG. 1, according to an example embodiment.

FIG. 3 depicts one embodiment of storage appliance 300 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 300 includes hardware-level components and software-level components. The hardware-level components include one or more physical machines, such as physical machine 314 and physical machine 324. The physical machine 314 includes a network interface 316, processor 318, memory 320, and disk 322 all in communication with each other. Processor 318 allows physical machine 314 to execute computer readable instructions stored in memory 320 to perform processes described herein. Disk 322 may include a hard disk drive and/or a solid-state drive. The physical machine 324 includes a network interface 326, processor 328, memory 330, and disk 332 all in communication with each other. Processor 328 allows physical machine 324 to execute computer readable instructions stored in memory 330 to perform processes described herein. Disk 332 may include a hard disk drive and/or a solid-state drive. In some cases, disk 332 may include a flash-based SSD or a hybrid HDD/

SSD drive. In one embodiment, the storage appliance 300 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 200 in FIG. 1, or a hypervisor, such as hypervisor 208 in FIG. 2, to communicate with the storage appliance 300 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 208 in FIG. 2, may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority ofnodeG) may be G-i) modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 302, a virtualization interface 304, a distributed job scheduler 308, a distributed metadata store 310, a distributed file system 312, and one or more virtual machine search indexes, such as virtual machine search index 306. In one embodiment, the software-level components of the storage appliance 300 may be run using a dedicated hardware-based appliance. In another embodiment, the software-level components of the storage appliance 300 may be run from the cloud (e.g., the software-level components may be installed on a cloud service provider).

In some cases, the data storage across a plurality of nodes in a cluster (e.g., the data storage available from the one or more physical machine (e.g., physical machine 314 and physical machine 324)) may be aggregated and made available over a single file system namespace (e.g., /snapshots/). A directory for each virtual machine protected using the storage appliance 300 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/and a second snapshot of Virtual Machine A may reside in/snapshots/VM_A/s2/).

The distributed file system 312 may present itself as a single file system, in which as new physical machines or nodes are added to the storage appliance 300, the cluster may automatically discover the additional nodes and automatically increase the available capacity of the file system for storing files and other data. Each file stored in the distributed file system 312 may be partitioned into one or more chunks or shards. Each of the one or more chunks may be stored within the distributed file system 312 as a separate file. The files stored within the distributed file system 312 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 310 may include a distributed database management system that provides high availability without a single point of failure. In one embodiment, the distributed metadata store 310 may comprise a database, such as a distributed document-oriented database. The distributed metadata store 310 may be used as a distributed key value storage system. In one example, the distributed metadata store 310 may comprise a distributed NoSQL key value store database. In some cases, the distributed metadata store 310 may include a partitioned row store, in which rows are organized into tables or other collections of related data held within a structured format within the key value store database. A table (or a set of tables) may be used to store metadata information associated with one or more files stored within the distributed file system 312. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 312 and metadata associated with the new file may be stored within the distributed metadata store 310. The distributed metadata store 310 may also be used to store a backup schedule for the virtual machine and a list of snapshots for the virtual machine that are stored using the storage appliance 300.

In some cases, the distributed metadata store 310 may be used to manage one or more versions of a virtual machine. Each version of the virtual machine may correspond with a full image snapshot of the virtual machine stored within the distributed file system 312 or an incremental snapshot of the virtual machine (e.g., a forward incremental or reverse incremental) stored within the distributed file system 312. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from a I-DD) to acquire the full image and, in parallel, performing one or more reads from the second storage device (e.g., performing fast random reads from an SSD) to acquire the one or more incremental aspects.

The distributed job scheduler 308 may be used for scheduling backup jobs that acquire and store virtual machine snapshots for one or more virtual machines over time. The distributed job scheduler 308 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 308 may schedule a specific job to be run on a particular node based on data stored on the particular node. For example, the distributed job scheduler 308 may schedule a virtual machine snapshot job to be run on a node in a cluster that is used to store snapshots of the virtual machine in order to reduce network congestion.

The distributed job scheduler 308 may comprise a distributed fault tolerant job scheduler, in which jobs affected by node failures are recovered and rescheduled to be run on available nodes. In one embodiment, the distributed job scheduler 308 may be fully decentralized and implemented without the existence of a master node. The distributed job scheduler 308 may run job scheduling processes on each node in a cluster or on a plurality of nodes in the cluster. In one example, the distributed job scheduler 308 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 310. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 308 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 308 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks was ever performed. The series of tasks may correspond with an ordering of tasks for the series of tasks and the distributed job scheduler 308 may ensure that each task of the series of tasks is executed based on the ordering of tasks. Tasks that do not have dependencies with each other may be executed in parallel.

In some cases, the distributed job scheduler 308 may schedule each task of a series of tasks to be performed on a specific node in a cluster. In other cases, the distributed job scheduler 308 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 308 may assign one or more tasks associated with a job to be executed on a particular node in a cluster based on the location of data required to be accessed by the one or more tasks.

In one embodiment, the distributed job scheduler 308 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 222 in FIG. 2, to create a frozen copy of the virtual machine and to transfer one or more chunks (or one or more files) associated with the frozen copy to a storage appliance, such as storage appliance 300 in FIG. 1. The one or more tasks may also include generating metadata for the one or more chunks, storing the metadata using the distributed metadata store 310, storing the one or more chunks within the distributed file system 312, and communicating with the virtualized infrastructure manager 222 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 92 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 304 may provide an interface for communicating with a virtualized infrastructure manager managing a virtualization infrastructure, such as virtualized infrastructure manager 222 in FIG. 2, and requesting data associated with virtual machine snapshots from the virtualization infrastructure. The virtualization interface 304 may communicate with the virtualized infrastructure manager using an Application Programming Interface (API) for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 304 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 306 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 306 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 312 in FIG. 3.

The data management system 302 may comprise an application running on the storage appliance 300 that manages and stores one or more snapshots of a virtual machine. In one example, the data management system 302 may comprise a highest-level layer in an integrated software stack running on the storage appliance. The integrated software stack may include the data management system 302, the virtualization interface 304, the distributed job scheduler 308, the distributed metadata store 310, and the distributed file system 312.

In some cases, the integrated software stack may run on other computing devices, such as a server or computing device 108 in FIG. 1. The data management system 302 may use the virtualization interface 304, the distributed job scheduler 308, the distributed metadata store 310, and the distributed file system 312 to manage and store one or more snapshots of a virtual machine. Each snapshot of the virtual machine may correspond with a point-in-time version of the virtual machine. The data management system 302 may generate and manage a list of versions for the virtual machine. Each version of the virtual machine may map to or reference one or more chunks and/or one or more files stored within the distributed file system 312. Combined together, the one or more chunks and/or the one or more files stored within the distributed file system 312 may comprise a full image of the version of the virtual machine.

Figure 4:
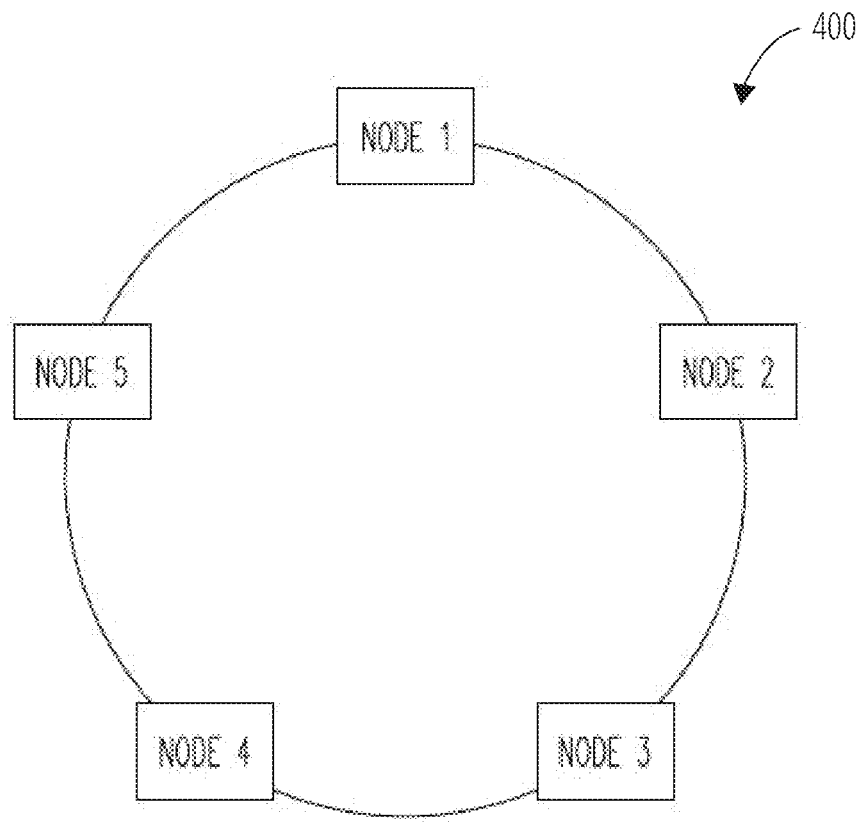
FIG. 4 shows an example cluster of a distributed decentralized database, according to some example embodiments.

FIG. 4 shows an example cluster 400 of a distributed decentralized database, according to some example embodiments. As illustrated, the example cluster 400 includes five nodes, nodes 1-5. In some example embodiments, each of the five nodes runs from different machines, such as physical machine 314 in FIG. 3 or virtual machine 220 in FIG. 2. The nodes in the example cluster 400 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the example cluster 400 in shards or chunks and decentralized in that there is no central storage device and no single point of failure. The system operates under an assumption that multiple nodes may go down, up, or become non-responsive, and so on. Sharding is splitting up of the data horizontally and managing each shard separately on different nodes. For example, if the data managed by the example cluster 400 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 400. For example, data written to node 1 can be replicated to nodes 2 and 3. If node 1 prematurely terminates, node 2 and/or 3 can be used to provide the replicated data. In some example embodiments, each node of example cluster 400 frequently exchanges state information about itself and other nodes across the example cluster 400 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a mentable, write-back cache). Each time the in-memory structure is full, the data is written to disk in a Sorted String Table data file. In some example embodiments, writes are automatically partitioned and replicated throughout the example cluster 400.

Reading: Any node of example cluster 400 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave database nodes, asymmetrical database nodes, federated databases), the nodes of example cluster 400 are configured to function the same way (e.g., as symmetrical peer database nodes that communicate via gossip protocol, such as Cassandra nodes) with no single point of failure. If one of the nodes in example cluster 400 terminates prematurely ("goes down"), another node can rapidly take the place of the terminated node without disrupting service. The example cluster 400 can be a container for a keyspace, which is a container for data in the distributed decentralized database system (e.g., whereas a database is a container for containers in conventional relational databases, the Cassandra keyspace is a container for a Cassandra database system).

Figure 5:
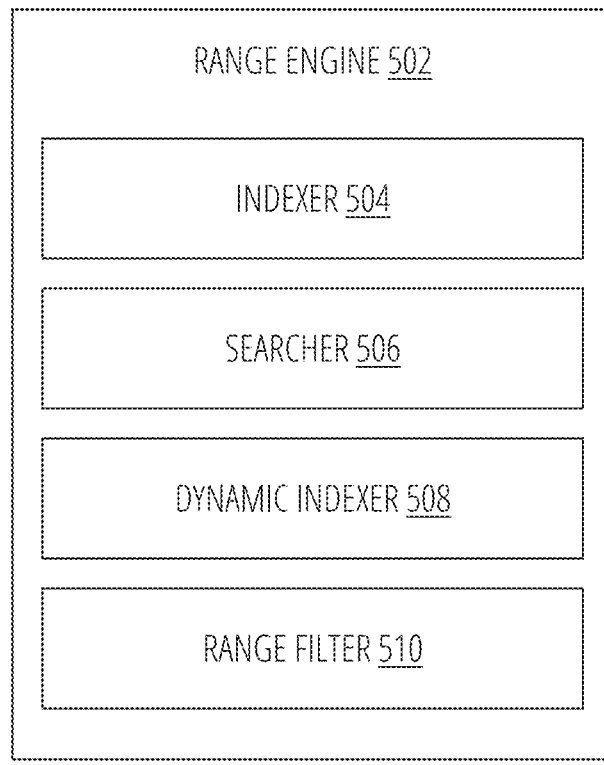
FIG. 5 depicts a range engine, according to some example embodiments.

FIG. 5 depicts a range engine 502, according to some example embodiments. The range engine 502 generates a range filter 510 of a backup file, such as a patch file. A first snapshot (base) usually contains the whole data being backed up, but subsequent snapshots usually only contain the changes since the previous snapshot (in order to save backup time and storage space).

As the snapshot chain grows longer, read performance gets worse because data has to be looked up in each snapshot. In order to reduce the snapshot chain length, the snapshot chain is Reversed/Consolidated (if snapshots expire). One of the main reasons to reverse a snapshot chain is to improve read performance.

The range engine 502 allows for very quick checks if a particular incremental snapshot contains data for a range or not. Incremental snapshots are usually sparse and do not contain data for a lot of ranges. Improving read performance in long snapshot chains will reduce the need for reverses. There are also other advantages of doing this:

1. Improve read performance of archival snapshot chains significantly. 2. Improve read performance of long journal chains; 3. Improve read performance of long patch file chains. Using range filters in patch files/journals improved read performance for large chains by up to 20%. Performance of dry reads (where only index blocks are read and not actually data blocks for a range) improved by up to 3×.

Backup files may be stored in patch file format, which can be a two-level index key value store. The file comprises data blocks followed by index blocks. Each index block contains information about the data blocks which come just before it. The final root index block contains information about all the index blocks. The root index block is stored in memory and the other index blocks are fetched on demand from disk. The range filter 510 can be stored in the root index block. A journal file is a log file which has a sequence of serialized extents. A journal has a corresponding index file to index into the journal file for a particular range lookup. A journal's index file can also be a two-level index key value store.

Figure 11:
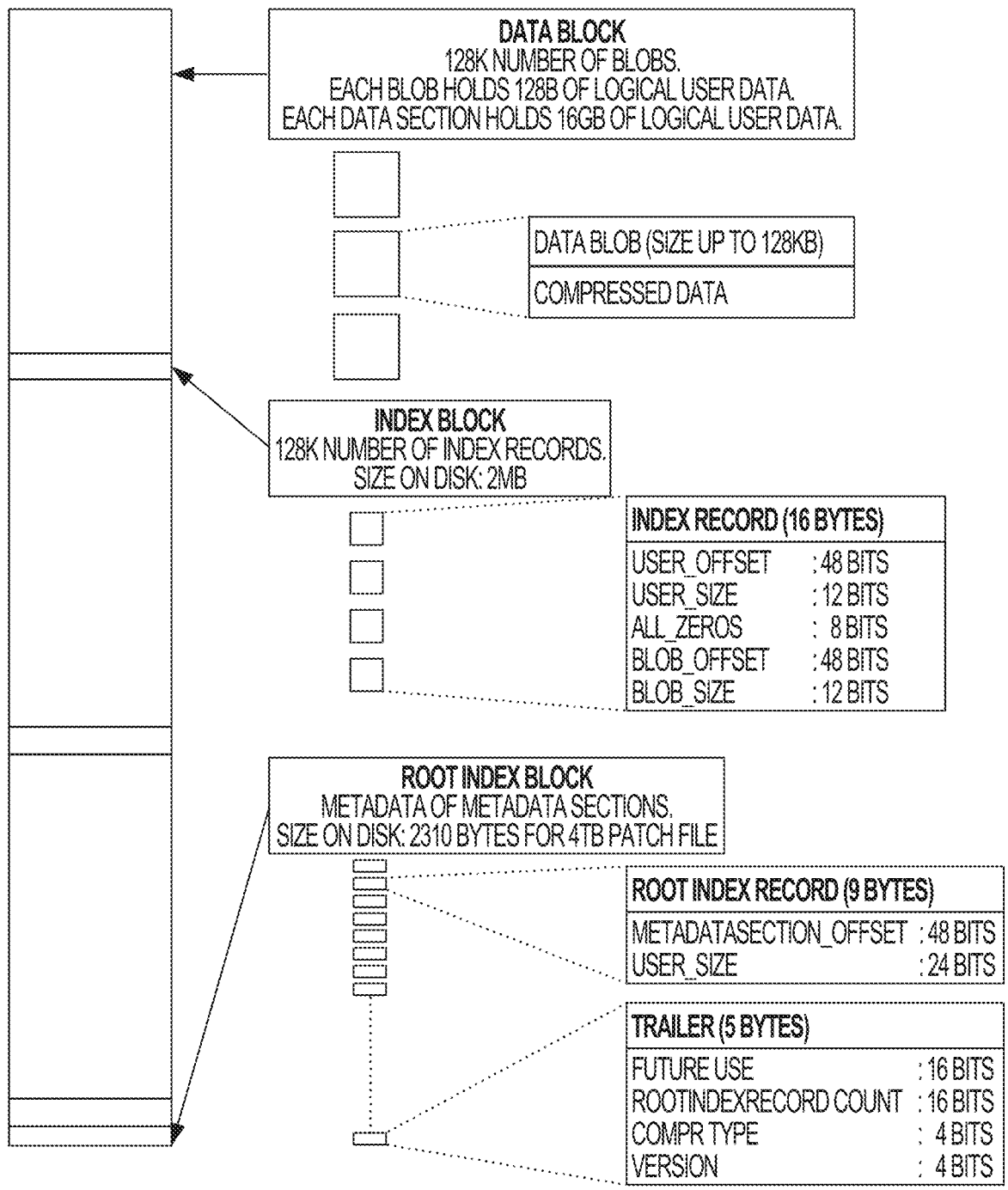
FIG. 11 illustrates a backup file in patch format, according to some example embodiments.

In one example, as seen in FIG. 11, each data block has 128 k blobs, each blob holds 128 KB of logical user data and each data section holds 16 GB of logical user data. Each index block is 128K index records with a size of 2 MB. The root index block, which can hold the range filter 510, can be 2310 bytes for a 4 TB patch file.

The range filter 510 which may be stored as a bit vector where each bit represents whether the backup file (e.g., patch file or journal) has data for that range. As the range filter can be stored in the root index block of the two-level key value (kv) store, it will be loaded into memory upon opening the two-level kv store. With the range filter 510, by checking an in-memory bit it can be determined if a snapshot in the backup file has data for that range. Range filters can give false positives so the range size needs to be chosen appropriately for the use case. Large range size would mean smaller range filter sizes (fewer bits are required), but less accurate range filters. The size of the bit vector required is LOGICAL_SIZE/(RANGE_SIZE*8) bytes. So to cover a 4

TB logical size with a 64 MB range size, we would need an 8 KB of space in the root index block of the two-level kv store.

The range engine 502, comprises an indexer 504, a searcher 506, a dynamic indexer 508, and a range filter 510 (which may be stored in the backup file or separately). During operation of the range engine 502 the indexer 504 scans each snapshot stored in a backup file, generates a range filter 510 for each snapshot and stores the generated range filters 510 in the backup file (e.g., in the root index) or elsewhere. The indexer 504 may execute method 700, which will be discussed further in conjunction with FIG. 7. The searcher 506, when receiving a request to search for data in backup, e.g., to recover a file, searches the generated range filters 510 to see if data is in range in the snapshot and only then reads the relevant index block to pull the data. The searcher 506 can execute the method 800, which will be discussed in further detail in conjunction with FIG. 8.

The dynamic indexer 508 adjusts a range size of the generated range filters 510 by ORing adjacent bits as a backup file grows in size as will be discussed in further detail in conjunction with FIG. 9. This can be set manually or done automatically whenever the backup file grows a predefined amount to ensure speedy searching. Note that the dynamic indexer 508 can adjust a subset of the generated range filters 510 and retain a lower range size for the remaining range filters 510.

Figure 6:
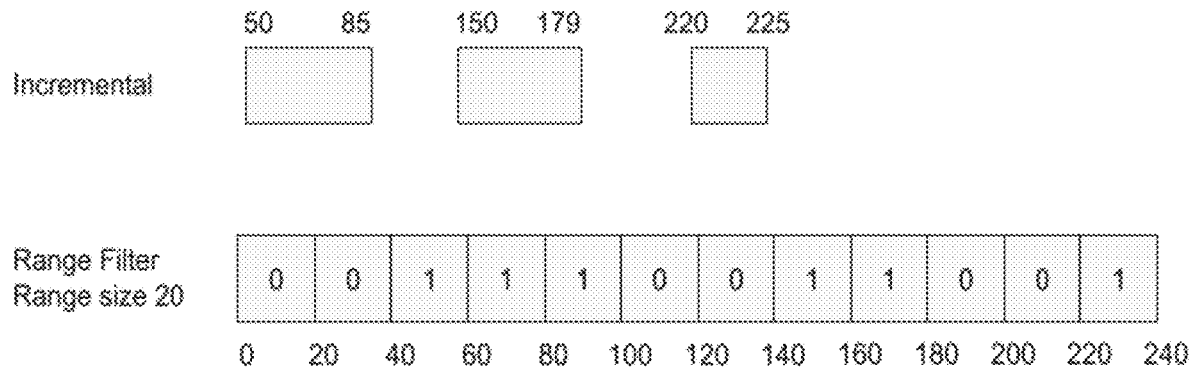
FIG. 6 illustrates a range filter, according to some example embodiments.

FIG. 6 illustrates a range filter 510, according to some example embodiments. In an embodiment, there is one range filter for each snapshot stored in the backup file. Range filter size may be constant for all range filters or may vary for each range filter or a subset of range filters. In the example of FIG. 6, the range size is set to 20 and the corresponding incremental snapshot has data at offsets 50-85, 150-79 and 220-225. Accordingly, the example range filter of FIG. 6 will have bits set to 1 at ranges 40-60, 60-80, 140-160, 160-180, and 220-240. Each range filter 510 may also include a field or fields (not shown) identifying its corresponding snapshot and/or range size.

With the range filter 510, by just checking an in-memory bit a requestor can find out if a backup file (e.g., incremental snapshot or a journal) has data for that range. If the bit in the range filter corresponding to a range is 0, then that range is surely not contained in the backup file. If the bit is 1, then the backup file may contain the data for the requested range. Range filters can give false positives so the range size needs to be chosen appropriately for the use case. Large range size would mean smaller range filter sizes (fewer bits are required), but less accurate range filters. The size of the bit vector required is LOGICAL_SIZE/(RANGE_SIZE*8) bytes. So to cover a 4 TB logical size with a 64 MB range size, we would need an 8 KB of space in the root index block of the backup file.

Figure 7:
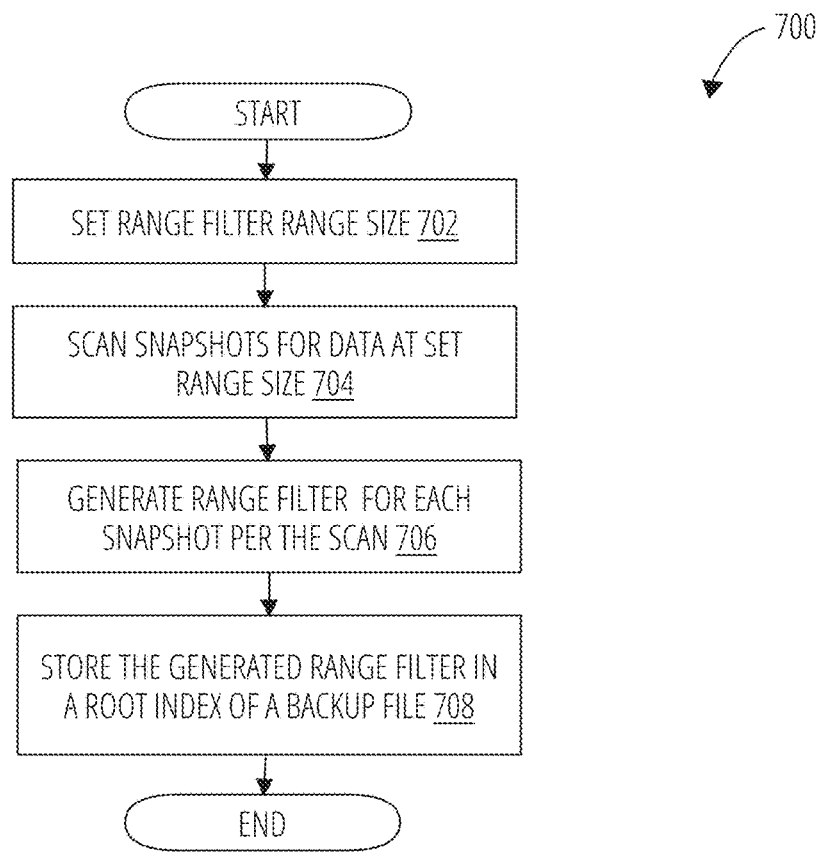
FIG. 7 illustrates a method of generating a range filter bit vector, according to some example embodiments.

FIG. 7 illustrates a method 700 of generating a range filter 510, according to some example embodiments. Initially, a range filter range size can be set in block 702. This may be a default range size or adjusted based on the size of backup file or snapshots therein. As will be discussed further in conjunction with FIG. 9, the range filter size can also be adjusted dynamically. Next, at block 704, snapshots within the backup file are scanned at the set range size set at block 702. Scanning to see if data is present can be done scanning a corresponding index block for the snapshot in an embodiment. Based on the results of the scan, a range filter 510 is generated at block 706 for each snapshot such as in the example of FIG. 6. The generated range filters range filter 510 are then stored at block 708 in a root index of the backup file and/or elsewhere. Range filters may also be generated while creating an incremental snapshot file or a two level index kv store, thus avoiding extra I/O required for it's generation.

Figure 8:
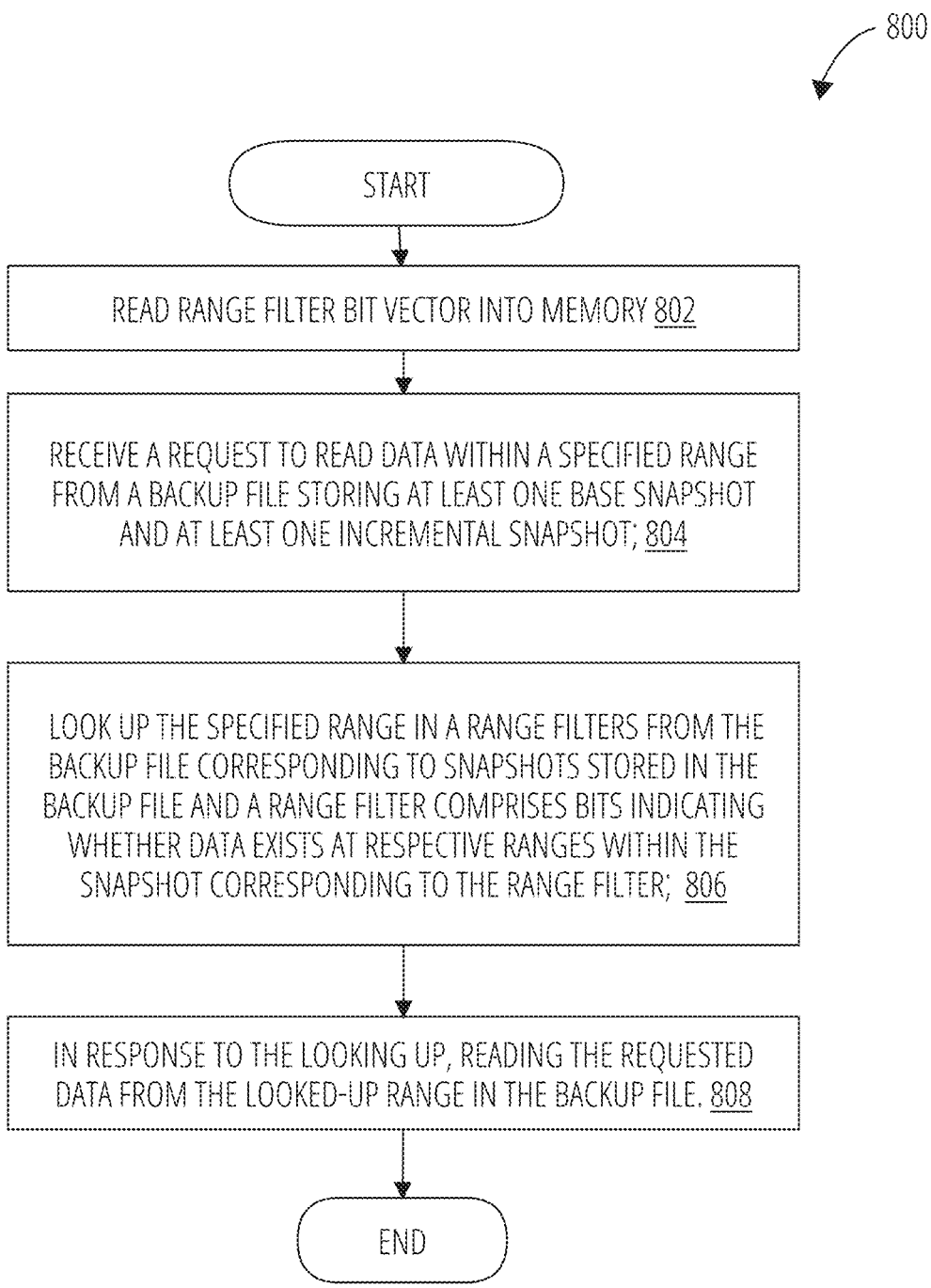
FIG. 8 illustrates a method of reading requested data from a backup file using the range filter bit vector, according to some example embodiments.

FIG. 8 illustrates a method 800 of reading requested data from a backup file using the range filter (which can be stored as a bit vector), according to some example embodiments. At block 802 the range filters 510 are read into memory. This can include the range size for the range filters 510 if not constant or predefined (e.g., using a default setting). At block 804 a request to read data within a specified range from a backup file storing at least one base snapshot and at least one incremental snapshot is received. This may be for the purpose of, for example, restoring an individual file or consolidating snapshots.

At block 806, the specified range is looked up in a range filters (bit vector) from the backup file corresponding to snapshots stored in the backup file. As mentioned previously, each range filter comprises bits indicating whether data exists at respective ranges within the snapshot corresponding to the range filter. If a range filter indicates that a backup file does not contain the range (the bit for the range is 0), then lookup in that backup file is skipped, this avoiding the disk I/O of loading the index block of that backup file. After the range is identified via the looking up at block 806, the requested data is read from the looked-up range in the backup file from relevant snapshots stored therein at block 808. The read data can then be passed to the requesting entity (e.g, search entity to return search results, file restore entity for use in a file restore operation, etc.).

Figures 9, 10:
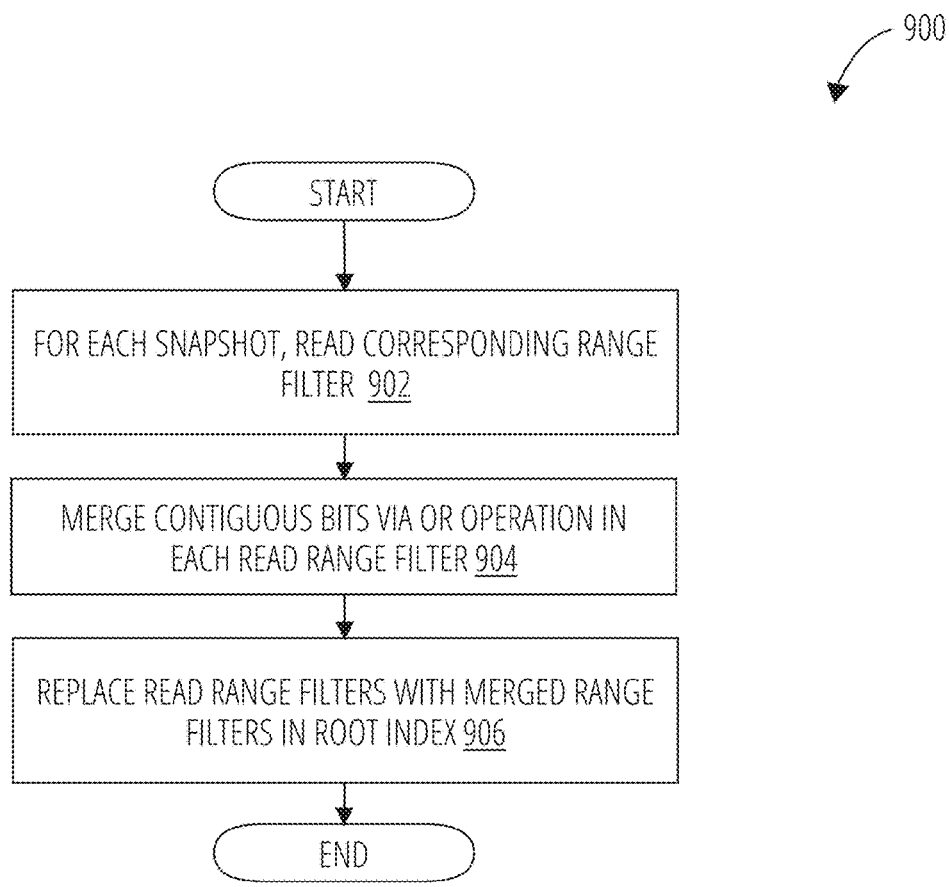
FIG. 9 illustrates a method of dynamic range filter sizing, according to some example embodiments.
FIG. 10 illustrates range filter that is dynamically adjusted, according to some example embodiments.

FIG. 9 illustrates a method 900 of dynamic range filter sizing, according to some example embodiments. Range filter sizing can be set by a user or automatically adjusted as a backup file increases in size (e.g., double a range filter size when a backup file doubles in range or size). In method 900, first, the dynamic indexer 508 reads at block 902 the bit range filter of each snapshot in the backup file. Next, contiguous bits are merged with an OR operation at block 904. Finally, the read range filters are replaced with the merged range filters in the root index and/or elsewhere at block 906.

An example of a dynamically adjusted range filter can be seen in FIG. 10. The range filter size is being increased from 20 to 40. Accordingly, in the adjusting range filter, a bit is set to 0 at offset 0-40 as 0 OR 0 in original offsets (0-20, 20-40) is 0. However, at offset 40-80 in the adjusted range filter is set to 1 as 1 OR 1 from the original range filter (at offsets 40-60 and 60-80) is 1.

For example, the range filter can initially have a maximum size of 8 KB and set a fine grained range size, such as 1 MB, which can therefore cover a logical size of 64 GB. If a write comes for an offset greater than the supported logical size, the range size of the range filter can be doubled while keeping the range filter size the same. Keeping the range filter size the same has the advantage of not using any extra memory while supporting the required logical size. This makes the range filter less accurate, but can increase the max range size supported. Using dynamic sizing, the range filter can be fine grained range, and then grow dynamically based on the logical size needed to support as more writes come into the backup file.

In view of the disclosure above, various examples are set forth below. It should be noted that one or more features of an example, taken in isolation or combination, should be considered within the disclosure of this application.

1. A method, comprising:
   receiving a request to read data within a specified range from a backup file storing at least one base snapshot and at least one incremental snapshot;
   looking up the specified range in range filters from the backup file, the range filters corresponding to snapshots stored in the backup file and each range filter comprising bits indicating whether data exists at respective ranges within the snapshot corresponding to the respective range filter; and
   in response to the looking up, reading the requested data from the looked-up range in the backup file.

2. The method of example 1, wherein each range filter is generated by:
   setting a range filter size;
   scanning snapshots for data at the set range size;
   generating corresponding range filters for each snapshot based on the scanning; and storing the generated range filters in a root index of the backup file.

3. The method of any of the prior examples, further comprising adjusting the range filter size as the backup file increases in size.

4. The method of any of the prior examples, wherein the adjusting the range filter size doubles the range filter size when the backup file doubles in size.

5. The method of any of the prior examples, wherein the backup file is two-level index key value store.

6. The method of any of the prior examples, wherein each range filter is generated by:
   setting a range filter size;
   scanning snapshot indices for data at the set range size;
   generating corresponding range filters for each snapshot index based on the scanning; and
   storing the generated range filters in a root index of the backup file.

7. The method of any of the prior examples, further comprising restoring a backed-up file using the read requested data.

8. The method of any of the prior examples, wherein the range filters are stored as range filter bit vectors.

9. The method of any of the prior examples, further comprising reading a root index having the range filters into memory without reading snapshot indices into memory.

10. A non-transitory computer-readable storage medium, the computer-readable storage medium including instructions that when executed by a computer, cause the computer to:
    receive a request to read data within a specified range from a backup file storing at least one base snapshot and at least one incremental snapshot;
    look up the specified range in range filters from the backup file, the range filters corresponding to snapshots stored in the backup file and each range filter comprising bits indicating whether data exists at respective ranges within the snapshot corresponding to the respective range filter; and
    in response to the looking up, reading the requested data from the looked-up range in the backup file.

11. A computing apparatus comprising:
    a processor; and
    a memory storing instructions that, when executed by the processor, configure the apparatus to:
       receive a request to read data within a specified range from a backup file storing at least one base snapshot and at least one incremental snapshot;
       look up the specified range in range filters from the backup file, the range filters corresponding to snapshots stored in the backup file and each range filter comprising bits indicating whether data exists at respective ranges within the snapshot corresponding to the respective range filter; and
       in response to the looking up, reading the requested data from the looked-up range in the backup file.

12. The computing apparatus of claim 11, wherein each range filter is generated by:
    setting a range filter size;
    scanning snapshots for data at the set range size;
    generating corresponding range filters for each snapshot based on the scanning; and
    storing the generated range filters in a root index of the backup file.

13. The computing apparatus of any of the prior examples, wherein the instructions further configure the apparatus to adjust the range filter size as the backup file increases in size.

14. The computing apparatus of any of the prior examples, wherein the adjusting the range filter size doubles the range filter size when the backup file doubles in size.

15. The computing apparatus of any of the prior examples, wherein the range filter is a bit vector and the adjusting the range filter size doubles the range filter size by ORing adjacent bits in the range filter.

16. The computing apparatus of any of the prior examples, wherein the backup file is two-level index key value store.

17. The computing apparatus of any of the prior examples, wherein each range filter is generated by:
    setting a range filter size;
    scanning snapshot indices for data at the set range size;
    generating corresponding range filters for each snapshot index based on the scanning; and
    storing the generated range filters in a root index of the backup file.

18. The computing apparatus of any of the prior examples, wherein the instructions further configure the apparatus to restore a backed-up file using the read requested data.

19. The computing apparatus of any of the prior examples, wherein the range filters are stored as range filter bit vectors.

20. The computing apparatus of any of the prior examples, wherein the instructions configure the apparatus to read a root index having the range filters into memory without reading snapshot indices into memory.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to specific example embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
receiving a request to read data within a specified logical address range from a backup file storing at least one base snapshot and at least one incremental snapshot;
looking up the specified logical address range in range filters associated with the backup file, the range filters corresponding to respective snapshots stored in the backup file and each range filter comprising bits indicating whether a corresponding snapshot includes data within a corresponding logical address range of the backup file that is spanned by the range filter, wherein at least two of the range filters span at least the specified logical address range from the backup file; and
in response to the looking up, reading the requested data from the looked-up range in the backup file.

2. The method of claim 1, wherein each range filter is generated by:
setting a range filter size;
scanning snapshots for data at the set range filter size;
generating corresponding range filters for each snapshot based on the scanning; and
storing the generated range filters in a root index of the backup file.

3. The method of claim 2, further comprising adjusting the range filter size as the backup file increases in size.

4. The method of claim 3, wherein the adjusting the range filter size doubles the range filter size when the backup file doubles in size.

5. The method of claim 1, wherein the backup file is a two-level index key value store.

6. The method of claim 1, wherein each range filter is generated by:
setting a range filter size;
scanning snapshot indices for data at the set range filter size;
generating corresponding range filters for each snapshot index based on the scanning; and
storing the generated range filters in a root index of the backup file.

7. The method of claim 1, further comprising restoring a backed-up file using the read requested data.

8. The method of claim 1, wherein the range filters are stored as range filter bit vectors.

9. The method of claim 1, further comprising reading a root index having the range filters into memory without reading snapshot indices into memory.

10. A non-transitory computer-readable storage medium, the computer-readable storage medium including instructions that when executed by a computer, cause the computer to:
receive a request to read data within a specified logical address range from a backup file storing at least one base snapshot and at least one incremental snapshot;
look up the specified logical address range in range filters associated with the backup file, the range filters corresponding to respective snapshots stored in the backup file and each range filter comprising bits indicating whether a corresponding snapshot includes data within a corresponding logical address range of the backup file that is spanned by the range filter, wherein at least two of the range filters span at least the specified logical address range from the backup file; and
in response to the looking up, reading the requested data from the looked-up range in the backup file.

11. A computing apparatus comprising:
a processor; and
a memory storing instructions that, when executed by the processor, configure the apparatus to:
receive a request to read data within a specified logical address range from a backup file storing at least one base snapshot and at least one incremental snapshot;
look up the specified logical address range in range filters associated with the backup file, the range filters corresponding to respective snapshots stored in the backup file and each range filter comprising bits indicating whether a corresponding snapshot includes data within a corresponding logical address range of the backup file that is spanned by the range filter, wherein at least two of the range filters span at least the specified logical address range from the backup file; and
in response to the looking up, reading the requested data from the looked-up range in the backup file.

12. The computing apparatus of claim 11, wherein each range filter is generated by:
setting a range filter size;
scanning snapshots for data at the set range filter size;
generating corresponding range filters for each snapshot based on the scanning; and
storing the generated range filters in a root index of the backup file.

13. The computing apparatus of claim 12, wherein the instructions further configure the apparatus to adjust the range filter size as the backup file increases in size.

14. The computing apparatus of claim 13, wherein the adjusting the range filter size doubles the range filter size when the backup file doubles in size.

15. The computing apparatus of claim 13, wherein the range filter is a bit vector and the adjusting the range filter size doubles the range filter size by ORing adjacent bits in the range filter.

16. The computing apparatus of claim 11, wherein the backup file is a two-level index key value store.

17. The computing apparatus of claim 11, wherein each range filter is generated by:
setting a range filter size;
scanning snapshot indices for data at the set range filter size;
generating corresponding range filters for each snapshot index based on the scanning; and
storing the generated range filters in a root index of the backup file.

18. The computing apparatus of claim 11, wherein the instructions further configure the apparatus to restore a backed-up file using the read requested data.

19. The computing apparatus of claim 11, wherein the range filters are stored as range filter bit vectors.

20. The computing apparatus of claim 11, wherein the instructions configure the apparatus to read a root index having the range filters into memory without reading snapshot indices into memory.

* * * * *